May 18, 1965  R. G. HUMMER  3,184,248
BABY SEATS FOR TELESCOPING GROCERY CARTS
Filed Nov. 29, 1962  2 Sheets-Sheet 1

INVENTOR
RALPH G. HUMMER
BY
ATTORNEY

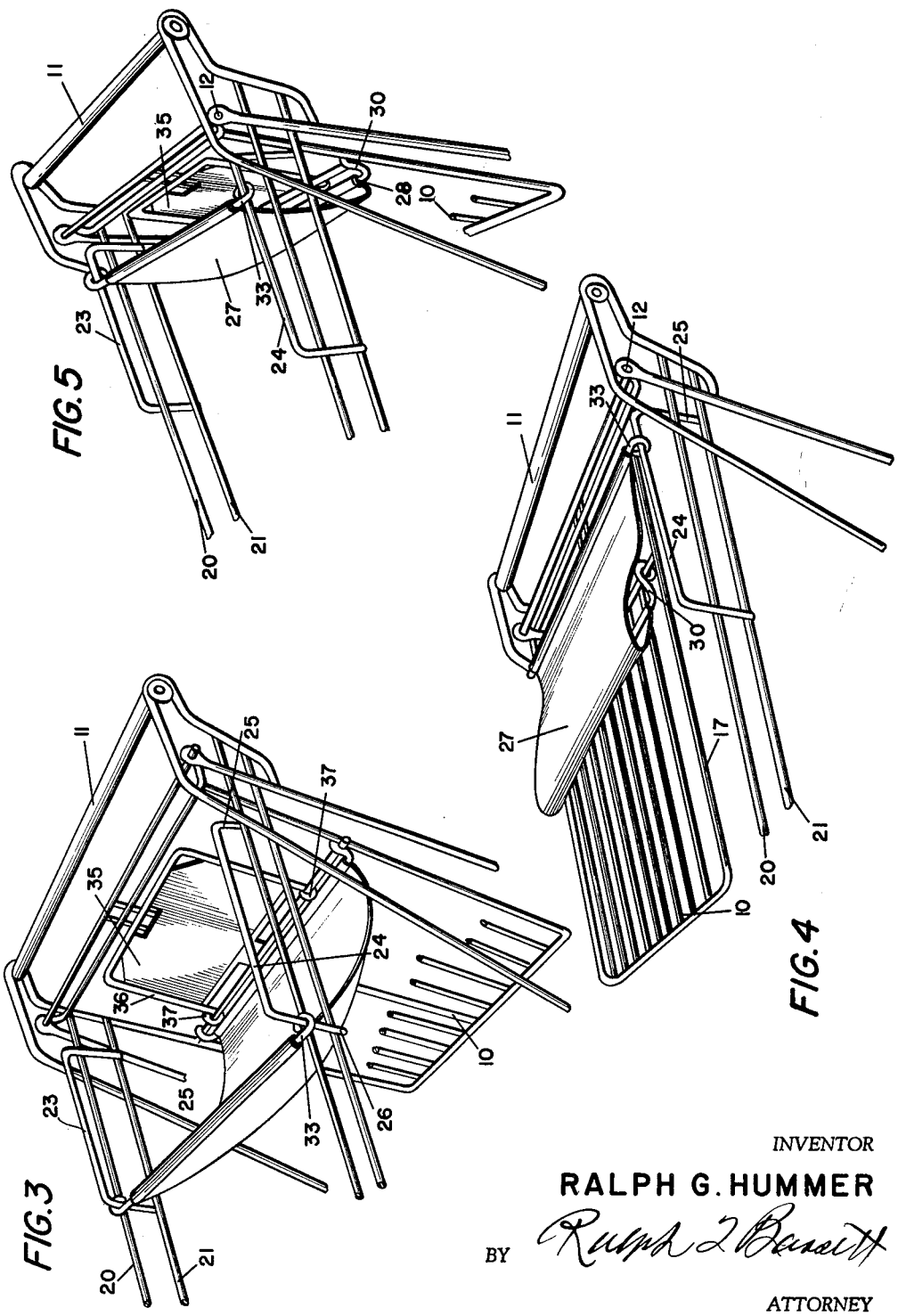

United States Patent Office 3,184,248
Patented May 18, 1965

3,184,248
BABY SEATS FOR TELESCOPING GROCERY CARTS
Ralph G. Hummer, Oklahoma City, Okla., assignor to Folding Carrier Corporation, division of Union Asbestos & Rubber Company, Oklahoma City, Okla.
Filed Nov. 29, 1962, Ser. No. 240,945
2 Claims. (Cl. 280—33.99)

This invention relates to improvements in baby seats for use in telescoping grocery carts.

One of the objects of this invention is to provide a baby seat structure which does not include a supporting inner panel whereby the capacity of the cart is materially increased.

A further object of this invention is to provide a baby seat which can be collapsed against the hinged gate when not in use and which, when extended to supporting position, provides a hammock-like support which cooperates with the gate panel.

More specifically the invention comprehends the use of a fabric or flexible plastic panel mounted at its ends in the form of a hammock, the outer end of the plastic seat structure being secured at its transverse margin to the gate structure immediately below the leg openings and the inner upper margin of the seat being supported by a transverse rod mounted on aligned guideways to permit travel of the inner end to a position against the gate structure to provide maximum carrying capacity for the basket.

These and other objects of the invention will more clearly hereinafter appear by reference to the accompanying drawings forming a part of the instant specification and wherein like characters of reference designate corresponding parts throughout the several views, in which:

FIG. 3 is a similar view showing the leg opening closure plate in its upright position;

FIG. 4 is a similar fragmentary view of the rear upper portion of the gate with the gate panel in lifted position and the flexible seat collapsed thereagainst; and FIG. 5 is the same perspective view of the basket with the hinged gate lowered and the flexible seat collapsed thereagainst.

Figure 1:
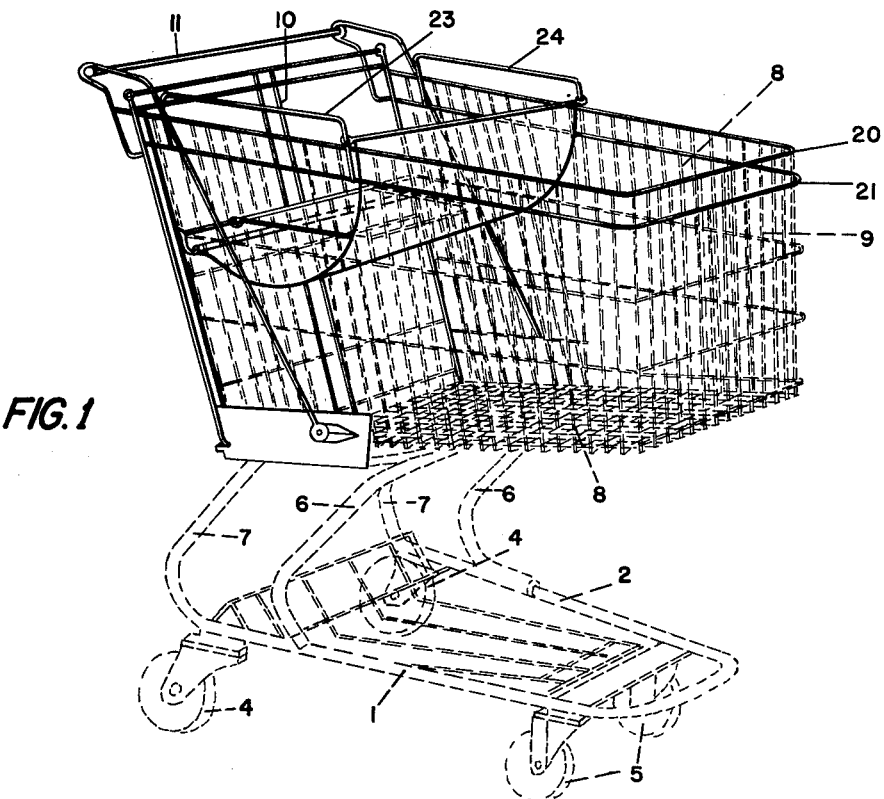
FIG. 1 is a perspective view showing a telescoping cart of conventional type embodying the instant invention.

Referring now to FIG. 1, the bottom carriage structure including the forwardly converging side rails 1 and 2 is shown mounted on the rear wheels 4 and front wheels 5. Extending upwardly from the bottom carriage structure are the front basket supports 6 and the rear basket supports 7, the basket being fixed to these parts and including the converging side walls 8, end wall 9, hinged gate structure 10 and handle 11.

Referring now to FIGS. 2 to 5, inclusive, it will be seen that the hinged gate 10 is pivotally mounted at 12 and is adapted to swing upwardly within the basket to a substantially horizontal position, as shown in FIG. 4, when a similarly constructed companion basket has been telescopically received therein as is conventional in the art, and as generally shown in Patent No. 2,689,133. The inwardly swinging gate 10 has a closed bottom portion terminating at transverse bar 14 fixed to the side frame members 16 and 17 at a point generally above the center of the gate structure. The upper portion of the gate panel 10 has central upright rods 18 which extend the entire length of the gate structure and together with the upper portions of the side frame members 16 and 17 define a pair of spaced leg openings which permit a seated child to extend his legs outwardly and prevent his displacement from the supporting structure.

The basket structure has extending about its upper marginal edge a pair of relatively heavy spaced horizontally extending frame members 20 and 21 which form the main brace for the upper portion of the basket assembly, the side walls of which are of relatively smaller gauge wire or rod. At the rear of the side walls of the basket structure and fixed to the frame members 20 and 21 at each side wall are guide rails 23 and 24. The guide rails 23 and 24 are both positioned above the upper frame members 20 and are fixed thereto by depending arms 25 and 26. The front arms 26 are positioned outwardly of the frame members 20 and 21 and the rear arms are positioned inwardly, whereby the guide rails 23 and 24 do not converge with the walls of the basket but provide parallel surfaces for the travel of the outer seat supporting frame to be hereinafter described. The depending arms 25 and 26 are welded at points of intersection to the upper frame members 20 and 21 so that the guides 23 and 24 are held in rigid position.

The seat supporting structure is in the form of a flexible panel 27 which may be of suitable woven fabric, impregnated cloth or a flexible plastic and the bottom edge is fixed to a transversely extending rod 28 terminating in hooks 29 which are wrapped about the brace rod 14 upon which the leg opening closure is hinged. The transversely extending rod 28 has terminal portions 30, the ends of which form the loops or hooks 29 and the terminal portions 30 providing for the spacing of the bottom edge of the panel which is supported by the rod 28. The upper edge of the flexible supporting panel 27 is fixed about a transverse rod 32, the terminals 33 of which are bent to define eyes which loosely wrap about the guide rails 23 and 24.

Figure 2:
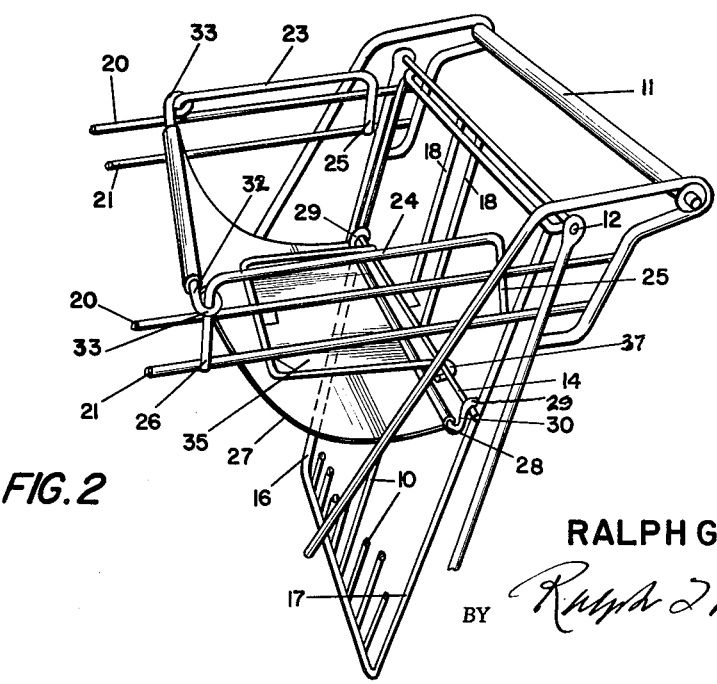
FIG. 2 is a fragmentary perspective view showing the seat in extended position with the leg opening closure plate lowered to seating position.

By this structure the inner marginal edge of the panel mounted on the transverse rod 28 can be moved along the guide rails 23 and 24 to an inner position against the hinged gate structure by sliding the eyes 33 along the guide rails and if the flexible seating panel is to be fixed, the loops or eyes 33 can be dropped over the outer rounded ends of the guide rails which would prevent their displacement. The same is true, as shown in FIG. 2, in which the eyes or loops 33 have traveled inwardly along the guide rails 23 and 24 and dropped downwardly over the adjacent portions of the depending arms 26. In this latter position it will be obvious that the flexible seat has been moved to a fixed position and is held against displacement whether the flexible seating panel is used for supporting small articles of lading or for supporting a child.

If a child is to be placed on the seat, as shown in FIG. 2, the leg opening closure 35 can be dropped from its upright position, shown in FIG. 3, to a lowered child-supporting position, shown in FIG. 2. The leg opening closure includes a U-shaped wire frame, best shown in FIG. 3, and indicated at 36, the U-shaped frame terminating in eyes or loops 37 which are wrapped about the transverse rod 14 of the gate. The U-shaped frame 36 is closed by a plastic or metal plate as shown and when in its upright position fills the major portion of the leg openings, as may be desired. Obviously this leg opening closure may be formed with any suitable dimensions to provide an appropriate closure and also an appropriate seating surface when in its lowered position, as shown in FIG. 2. When in the latter position the child is free to sit on the lowered leg opening closure plate 35 and project his legs through the leg openings in the upper part of the hinged gate structure.

By referring to FIG. 3 the position of the parts, including the fabric seat structure and the leg opening closure, is illustrated in position for supporting small breakable commodities and the like, while in FIG. 4 these parts are shown when the hinged rear gate of the telescoping cart has been moved forcibly upwardly by the telescopic association of a telescoping cart of the same structure and design. In this latter view it will be noted that the movement of the hinged gate 10 to its upper horizontal position has lifted the loops 33 of the flexible seat supporting rod 32 from the vertical leg portions 26 of the guideways and has permitted this inner portion of the seat supporting structure to travel outwardly along the guideways 23 and 24 and has permitted the flexible seat 27 to fold upon itself. When a cart having the improved flexible seat is free from telescopic association with a companion cart, which association would result in the position of the parts as shown in FIG. 4, the hinged gate 10 will, due to its hinged mounting, drop to its lower basket closing position as shown in FIG. 5 with the seat retracted and folded, as shown in this figure.

What I claim is:

1. In a seat structure for telescoping carts having a bottom wall, a front wall and side walls, a gate forming a rear wall of the cart, said gate being pivoted to the upper rear portion of the cart for movement from a generally upright position to a generally horizontal position, leg openings in the upper portion of the gate, longitudinally extending guide tracks mounted on the side walls at the rear portion thereof adjacent said gate mounting, stop means at each end of said guide tracks, a flexible seating structure fixed to a rod at its inner upper end, said rod having terminal portions secured about said guide tracks for slidable movement therealong, means supporting the other end of said flexible panel on said gate at the bottom marginal portions of said leg openings, and a panel forming a leg opening closure hingedly supported on said gate structure adjacent the bottom of said leg openings for movement to an upper position closing said leg openings to a lower position resting on said panel.

2. In a seat structure for telescoping carts having a bottom wall, a front wall and side walls, a gate forming a rear wall of the cart, said gate being pivoted to the upper rear portion of the cart for movement from a generally upright position to a generally horizontal position, leg openings in the upper portion of the gate, elongated parallel tracks of inverted U-form mounted on the side walls at the rear portion thereof, the arms of said inverted U-form tracks extending downwardly for connection with said side walls and positioning the base of said inverted U-form tracks above said side walls, a flexible seating structure fixed to a rod at its inner upper end, means embracing said tracks for slidably mounting said rod on said guide tracks, means supporting the other end of said flexible panel on said gate at the bottom marginal portions of said leg openings, and a panel forming a leg opening closure hingedly supported on said gate structure adjacent the bottom of said leg openings for movement to an upper position closing said leg openings to a lower position resting on said panel.

References Cited by the Examiner

UNITED STATES PATENTS 3,057,635  10/62  Cibrowski _____ 280—33.99
3,070,384  12/62  Buczak _____ 280—33.99

A. HARRY LEVY, *Primary Examiner.*

PHILIP ARNOLD, *Examiner.*